No. 852,518. PATENTED MAY 7, 1907.
A. W. MURRAY.
VALVE.
APPLICATION FILED FEB. 20, 1905.

Witnesses:
O. M. Hennick
M. C. Moyer

Inventor:
Alexander Wilcoxson Murray
By S. H. Hopkins
Atty.

UNITED STATES PATENT OFFICE.

ALEXANDER WILCOXSON MURRAY, OF CHICAGO, ILLINOIS, ASSIGNOR OF ONE-HALF TO JOHN A. SALMON, OF CHICAGO, ILLINOIS.

VALVE.

No. 852,518.      Specification of Letters Patent.      Patented May 7, 1907.

Application filed February 20, 1905. Serial No. 246,519.

*To all whom it may concern:*

Be it known that I, ALEXANDER WILCOXSON MURRAY, a citizen of the United States, residing at Chicago, in the county of Cook and State of Illinois, have invented certain new and useful Improvements in Valves, of which the following is a specification.

My original aim and object was to provide a valve proper which was particularly suitable for use in the valve device shown in Letters Patent Number 703,805 which were granted to me on the first day of July, 1902, for improvements in ball cocks, and while I have, in the present invention, provided a valve which fully meets the requirements of the device shown and described in said patent, I have at the same time produced a valve of new construction and reserve to myself the exclusive right to use it in any valve device in which it may be useful. In the patent aforesaid the valve proper is comprised of a flexible diaphragm and a rigid annular disk, the diaphragm being provided with a perforation registering with that of the disk. It has been found in practice that this construction does not meet the requirements of the device shown in the patent, and I have therefore devised a valve proper which consists, broadly stated, of an inelastic annular disk, preferably of metal, and an adherent covering of elastic material,—preferably soft rubber completely incasing it. In its preferred form, and when intended for use in the valve device shown and described in the aforesaid patent, the valve consists of an annular disk of inelastic material completely incased on all sides by a coating of soft rubber, the coating itself being provided with a central opening, concentric with the opening in the inelastic disk.

Figure 1:
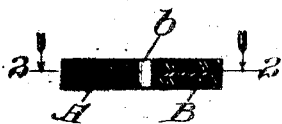
Figure 2:
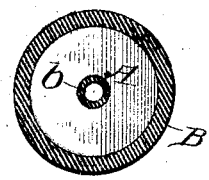
Figure 3:
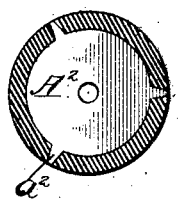

The invention consists in the features of novelty that are hereinafter described with reference to the accompanying drawing which is made a part of this specification and in which, Figure 1 is an axial section of a valve embodying the invention in its preferred form; Fig. 2 is a section thereof on the line 2—2, Fig. 1. Fig. 3 is a section, perpendicular to the axis, of a valve embodying a modification of the invention.

In its preferred form the valve comprises an annular disk, A, which is inelastic and preferably made of metal, and a coating, B, which completely surrounds and incases the disk A, and is provided with an opening, $b$, which, while being centrally located, does not expose the inner margin of the disk, A.

As a modification I have shown in Fig. 3 the inelastic disk, $A^2$, as being provided with radial spurs or tongues, $a^2$, aside from which the form of the invention shown in this figure does not differ from that shown in Figs. 1 and 2.

What I claim as new and desire to secure by Letters Patent is:

1. A valve comprising a disk of inelastic material and a facing of elastic material completely incasing the inelastic disk, substantially as described.

2. A valve comprising an annular disk of inelastic material and a facing or coating of elastic material completely incasing the inelastic disk and having a central perforation, substantially as described.

ALEXANDER WILCOXSON MURRAY.

Witnesses:
J. A. SALMON,
L. M. HOPKINS.